A. K. TERNSTEDT.
WINDOW OPERATING DEVICE.
APPLICATION FILED DEC. 19, 1911.

1,206,052.

Patented Nov. 28, 1916.
5 SHEETS—SHEET 1.

WITNESSES:
C. L. Belcher
F. B. Townsend

INVENTOR
Alvar K. Ternstedt
BY
Townsend & Decker
ATTORNEYS

UNITED STATES PATENT OFFICE.

ALVAR K. TERNSTEDT, OF NEW YORK, N. Y., ASSIGNOR TO PERFECT WINDOW REGULATOR COMPANY, OF NEW YORK, N. Y., A CORPORATION OF MAINE.

WINDOW-OPERATING DEVICE.

1,206,052.     Specification of Letters Patent.     Patented Nov. 28, 1916.

Application filed December 19, 1911. Serial No. 666,759.

*To all whom it may concern:*

Be it known that I, ALVAR K. TERNSTEDT, a subject of the King of Sweden, and a resident of New York, in the county of New York and State of New York, have invented certain new and useful Improvements in Window-Operating Devices, of which the following is a specification.

This invention relates to improvements in window operating devices, the main object of which is to provide a simple, positive and easily operated device for raising and lowering the window and automatically locking it in any desired position.

A further object is to provide simple and efficient means, positive and sure in operation, for automatically throwing the window over the weather rail when in closed position and for automatically withdrawing the window from the weather rail when it is desired to open the window. This part of the invention contemplates the employment, for simplicity, of a common actuating device for accomplishing both these results. It will be understood that it is not necessary for carrying out the invention that the window be lifted over the weather rail as in some cases it may merely be pressed against the rail and the common actuating device in both cases serves to positively move the window forward and backward transversely to the plane of the window. This part of the invention obviates the necessity of employing the ordinary leaf springs, as has heretofore been the practice, to force the window over the weather rail or to press it against the rail.

A further object is to provide the operating handle with a simple mechanism whereby the first movement given the handle to raise or lower the window will automatically unlock the window and a further movement of the same nature will automatically couple the window to the driving power, any movement of the operating handle other than a turning one being dispensed with. In other words it is the object of this part of the invention to provide an operating handle which controls the raising and lowering and locking and unlocking of the window and so constructed that its operation in carrying out its functions will be attended only by a rotary or swinging movement in one plane.

A still further object is to provide simple and effective means for automatically taking up the slack and stretch in the driving chain. It has been found that the most practical and efficient manner of operating windows is by driving a chain over sprockets but also it has been learned that trouble results owing to inability to keep the chain taut which when employed in moving vehicles is extremely objectionable owing to the rattle which occurs even when but a very slight looseness is present in the chain. By utilizing this part of this invention, the slack in the chain is automatically taken up as the chain stretches and at the same time the slack take-up device in no way interferes with the efficient driving of the chain or with its smoothness in passing over a sprocket. This part of my invention is of general application and not limited to use with window operating apparatus or apparatus of any particular type.

Other objects and novel features attributable to the device will readily occur to those skilled in the art from reading the subjoined description in connection with the accompanying drawings.

The invention is particularly adapted for use with carriage and automobile windows or sashes owing among other things to its simplicity, efficiency, ease of operation and freedom from rattle or noise and will be herein shown and described as applied to the operation of a carriage or automobile window. It will be understood, however, that such application of the invention is for the purpose of illustration only, the invention itself being applicable to windows of any desired character employed in connection with any structure whatever.

The invention consists in the improved window operating and controlling device hereinafter more particularly described and claimed.

The invention also consists in the novel parts, combinations of parts and details of construction of window operating apparatus hereinafter more particularly described and then specified in the claims.

The accompanying drawings show an arrangement for opening and closing windows embodying the present invention, the invention, for the purpose of illustration only being shown as applied to the window in a carriage or automobile door.

Figure 1:
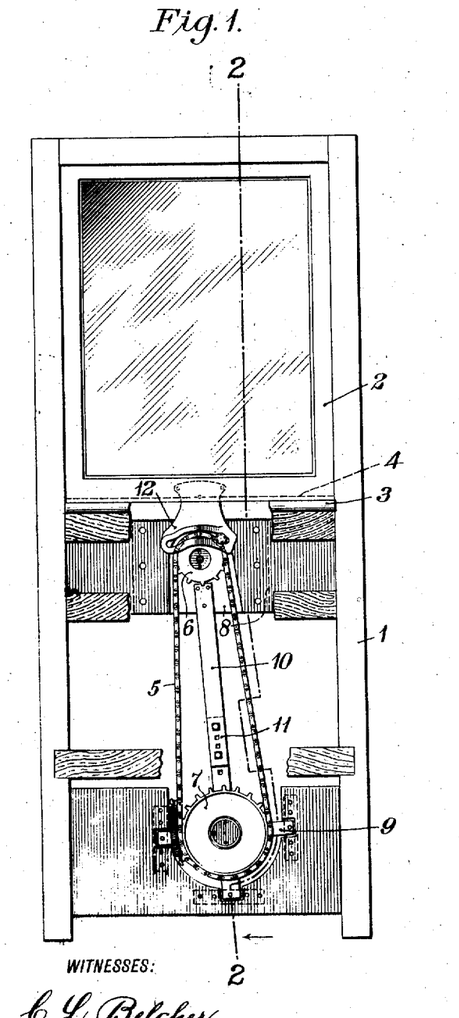
Figure 1 is a front elevation of a carriage door and window having raising and lowering mechanism constructed in accordance with this invention applied thereto, parts being broken away.
Figure 2:
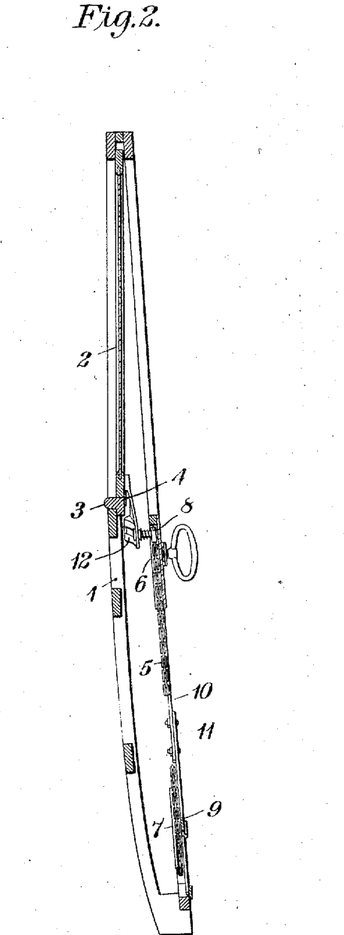
Fig. 2 is a vertical cross-section of the same taken on the irregular line 2, 2 Fig. 1.

Referring particularly to Figs. 1 and 2 of the drawings, 1 indicates the skeleton framework of an automobile door of standard construction in which the window sash 2 is slidably mounted.

3 indicates the window sill and 4 the weather rail of any desired form and construction. The window 2 slides up and down in guides in the sides of the door 1 as is usual and is lifted over the weather rail 4 when in closed position by mechanism to be presently described.

5 indicates the driving chain or belt of any desired construction, the traveling of which causes the window 2 to be raised or lowered according to the direction of travel of the chain 5. The chain passes over sprockets 6 and 7 of which the sprocket 6 is the driving sprocket. The sprocket 6 is suitably mounted on a metal plate 8 secured to the framework of the door 1 while the sprocket 7 is carried by a plate or crossarm 9 secured to the lower part of the door 1, the plates 8 and 9 being spaced apart by a spacing bar 10 adjustable as at 11 to vary the distance between the two sprockets to take care of variations in the length of the window sash 2. The sprockets and chain are supported in the hollow part of the door or other wall below the window sill 3 which also receives the window when lowered.

Figure 7:
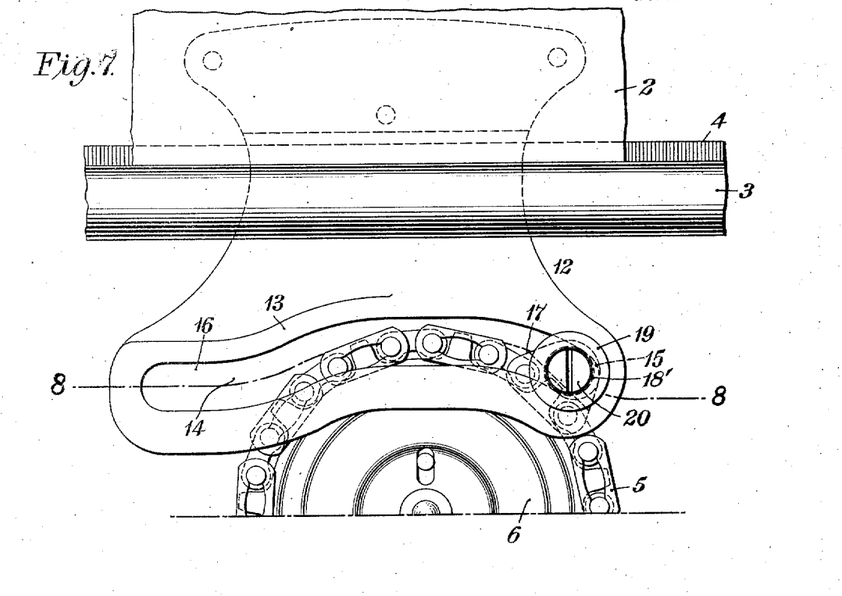
Fig. 7 is an enlarged rear elevation of the cam-plate by which the window is raised and lowered and moved transversely to its plane.
Figure 8:
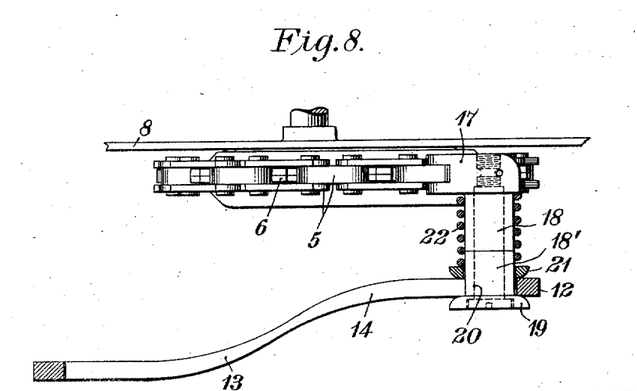
Fig. 8 is a generally horizontal section taken on the irregular line 8, 8 Fig. 7.

12 indicates a compound cam-plate fastened to the lower frame of the window sash so as to depend therefrom and into the space within the door below the window sill 3. The form of this cam-plate is more clearly shown in Figs. 7 and 8. It is preferably stamped or formed of sheet metal of the desired rigidity, the front face being formed into or provided with a cam portion 13 as indicated in Fig. 8 which projects forward from the plane of the plate 12 as a whole. The lower part of the plate 12 is provided with a cam-slot 14 preferably piercing the material of the plate. This slot follows the cam 13 and terminates at each end of the plate 12. The slot 14 is preferably horizontal for a certain distance intermediate its ends and preferably at the end terminating in the main plane of the plate 12 drops sharply downward as indicated at 15. The other end of the slot preferably also drops down, but more gradually, and terminates in an elongated substantially straight portion 16. The face cam 13 follows the curvature of the cam-slot 14.

A block 17 is substituted for one of the links of the chain 5, the block being pivotally connected to the links at either side and operating in the same manner as an ordinary link in the operation of the chain passing over the sprocket 6. The block 17 is provided with a spindle or pin 18 projecting laterally therefrom. The spindle or pin consists preferably for convenience in assembling of two parts 18 and 18' secured together by a bolt 20, the part 18' being provided at its outer end with a head 19. The spindle or pin passes through the cam-slot 14 and is provided with a collar or washer 21 loose thereon, the head 19 bearing on one side of the plate 12 while the collar 21 is pressed against the other side by a spring 22 compressed between the block 17 and collar 21. The head 19 and collar 21 are larger in diameter than the width of the slot 14 so that the plate 12 is at all times held between them, the part 18' or cam follower being free to rotate on the bolt 20.

It will thus be seen that the associated parts of the pin 18, to wit: the enlarged head 19 and the collar 21, engage the opposed surfaces of the depending plate 12 whereby the plate and consequently the window is securely held to the pin and any loose play or rattling is avoided.

As the chain 5 travels due to rotation of the sprocket 6 by mechanism to be presently described, the cam follower 18' travels in the slot 14 and when it comes to the cam surface 13 rides thereon and causes the plate 12 to be moved transversely in one direction or the other according to the direction of travel, the chain 5 and sprocket 6 being mounted permanently in the one plane. The plate being held positively on opposite faces by the collar 21 and head 19 will be positively forced in both directions as the follower travels in the slot 14 and rides up on or descends from the face cam 13. The loosely mounted spring pressed collar 21 permits the play necessary when the follower engages the curves of the cam 13 and yet maintains and insures a positive forcing of the plate in either transverse direction. The edges of the head 19 and collar 21 are rounded as shown to prevent any catching of sharp edges and reduce friction.

Figure 14:
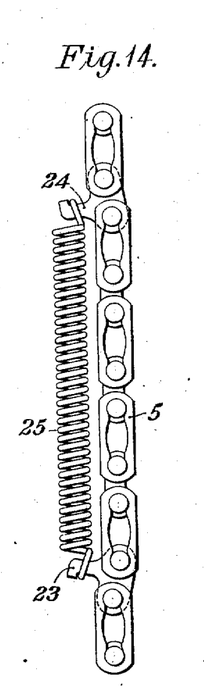
Fig. 14 is an enlarged view of a portion of the driving chain having the automatic slack take-up applied thereto.
Figure 15:
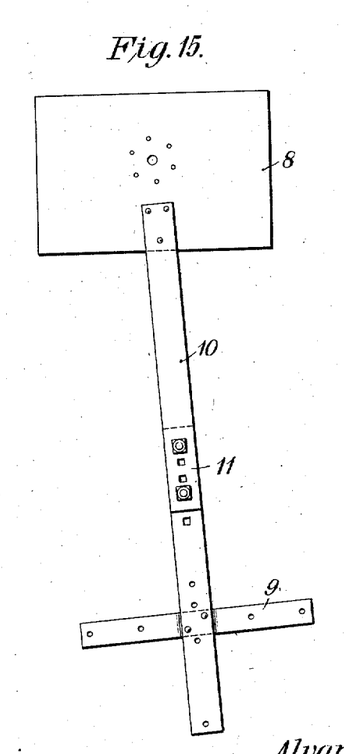
Fig. 15 is a detached front elevation of the framework upon which the driving mechanism is mounted.
Figure 16:
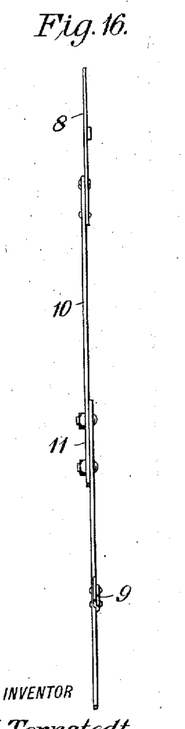
Fig. 16 is a side elevation of the same.

Two of the chain links located at any desired distance apart are provided with hooks 23 and 24 (see Fig. 14). A helical tension spring 25 is secured at each end to the hooks 23 and 24 so that any slack in the chain is taken up by the spring 25, the links between the hooks 23 and 24 merely buckling slightly, and the chain is at all times kept taut to insure that it will not swing and strike against the sides of the door and produce an objectionable rattle. It will be obvious that the spring take-up will not in any manner interfere with the chain passing properly over the teeth of the sprocket 7. By this construction the difficulty of having the chain taut at all times except by special hand tightening devices is obviated as should the chain stretch during use the spring 25 will immediately and automatically take up the slack and maintain the chain taut. The hooks 23 and 24 projecting laterally from a point intermediate the link pivots as shown and the spring 25 being connected to the ends of the hooks, the part of the chain between the ends of the spring is also maintained in taut condition.

The mechanism for operating the driving sprocket 6 and for locking and unlocking the window will now be described.

Figure 4:
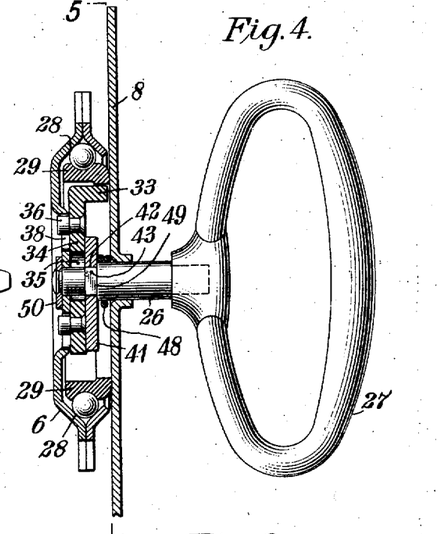
Fig. 4 is a transverse section taken on the line 4, 4 Fig. 3 and illustrates the preferred form of operating handle.

Referring to Fig. 4, 26 indicates a spindle passing through the inner wall of the door, the other end of which passes freely through the hub of the sprocket 6. The end of the spindle 26 opposite to that on which the sprocket 6 is located projects into the interior of the car or carriage through the plate 8 and is provided with an operating handle 27 of any desired form or character. The sprocket 6 may be of any desired construction and is preferably made of sheet metal in two halves secured together with a hollow hub within which the driving clutch and locking device are located. The hub portion of one of the sprocket halves is cut away for purposes to be presently described and the opening is closed by the plate 8 so that the clutch and locking device located within the sprocket hub are protected from dirt and damage. To eliminate friction the sprocket rotates on a ball-race 28 located in the hub of the sprocket and between it and a flange 29 rising from an annular plate or flat ring 30 rigidly fastened to the plate 8 in the opening in the sprocket hub heretofore referred to. The inner edge of the ring 30 is provided with a plurality of alternately arranged and evenly spaced teeth 31 and notches 32. The annular plate 30 with its teeth and notches constitutes the fixed locking member.

Figure 3:
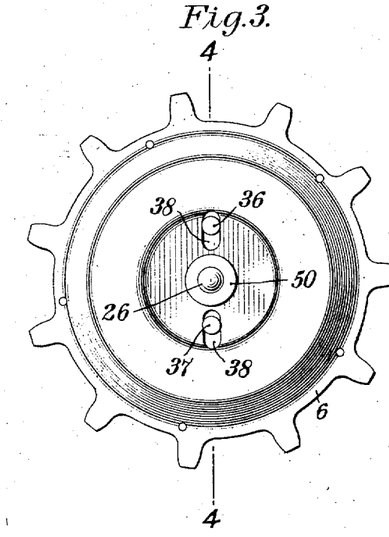
Fig. 3 is an enlarged elevation of the exterior of the driving sprocket and clutch.
Figures 9, 10:
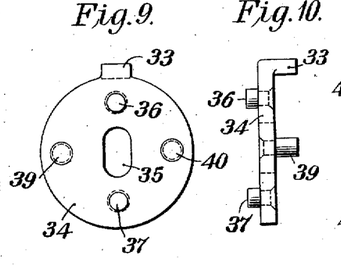
Figs. 9 and 10 are front and side elevations respectively of the combined locking pawl and driven member of the clutch which couples the driving power to the sprocket.

33 indicates a locking pawl which travels with the sprocket 6 and which enters the notches 32 of the fixed plate 30 when it is desired to lock the sprocket 6 and therefore the window. The pawl 33 is secured to and carried by a plate or disk 34 forming the driven member of the clutch. The clutch member 34 is provided with a centrally disposed slot 35 (see Fig. 9) through which the spindle 26 loosely passes and is also provided with a pair of diametrically disposed rearwardly extending pins 36 and 37 which work in slots 38 formed in the hub of the sprocket 6 (see Fig. 3). The clutch member 34 is also provided with a pair of diametrically disposed forwardly extending pins 39 and 40 and located alternately with the pins 36 and 37.

Figure 11:
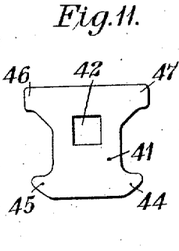
Fig. 11 is a front elevation of the actuating device for unlocking the window and which also forms the driving member of the clutch.
Figures 12, 13:
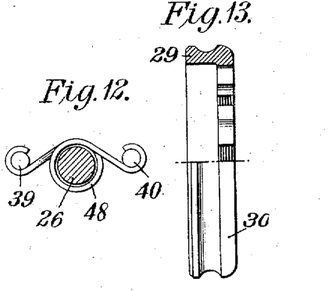
Fig. 12 is a detached view of the spring which co-acts with the locking plate shown in Fig. 9 and normally tends to keep the same in locked position.
Fig. 13 is a partial side elevation and section of the fixed lock member or plate with which the locking pawl shown in Fig. 9 co-acts to maintain the window in position.

The driving member of the clutch is preferably in the form of a plate 41 superimposed on the clutch member and keyed to the spindle 26 in any suitable manner such that on rotation of the spindle 26 the plate 41 will also be rotated. A simple and the preferable manner of keying the member 41 to the spindle is by providing it with a square hole 42 which fits tightly over a squared portion 43 of the spindle 26. The plate 41 is provided with four cams 44, 45, 46 and 47, two diametrically opposed ones of which, for instance 45 and 47, engage the pins 39 and 40 of the driven clutch member 34 when the spindle 26 and plate 41 are rotated in one direction while the cams 44 and 46 engage said pins when the spindle is rotated in the reverse direction. When either of the said pairs of cams engage the said pins a driving couple is established between the spindle 26 and the sprocket 6 by means of the engagement of the pins 36 and 37 with the sprocket hub in the slots 38.

Figure 5:
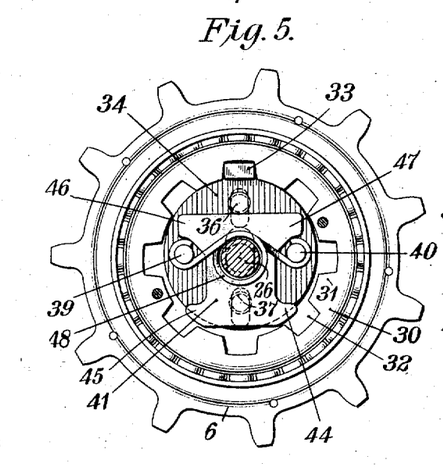
Fig. 5 is a section taken on the line 5, 5 Fig. 4 and shows the automatic lock and driving mechanism for the driving sprocket in elevation.
Figure 6:
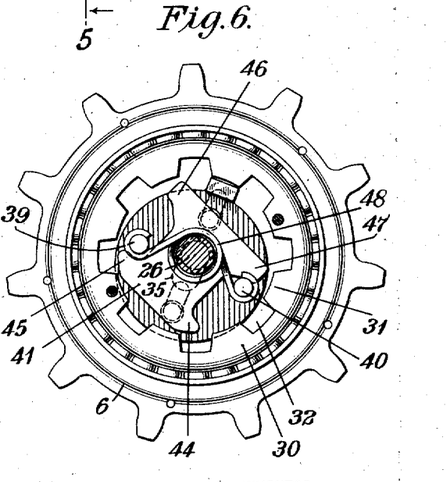
Fig. 6 is a view of the same mechanism as shown in Fig. 5, the lock being shown in inoperative position and the driving power coupled to the sprocket.

However, before the sprocket 6 can be rotated the locking pawl 33, which normally rests in a notch 32 of the fixed locking plate 30, must be withdrawn from its notch. The driven clutch member 34 is capable of bodily movement radially owing to the slot 35 and when the cams of the plate 41 engage the pins 39 and 40 the first action is to cause the plate 34 to move radially until the spindle 26 reaches the opposite end of the slot 35, the pins 36 and 37 also traveling in the slots 38, at which time the pawl 33 has been withdrawn from a notch 32 and the sprocket is free to be rotated. 48 indicates a tension spring wound a few turns around the spindle 26 and having its ends applied to the pins 39 and 40 of the plate 34 in such manner that normally the pawl 33 is pressed up into a notch 32. The first action of the plate 41 in rotating is to withdraw the pawl 33 against the action of the spring 48, the spring remaining ineffective so long as the plate 41 is rotated. As soon as the rotation ceases and the plate 41 is released (by releasing the operating handle 27) the spring 48 will immediately cause the pawl 33 to spring into one of the notches 32 and lock the sprocket to the fixed lock-plate 30 and prevent further rotation of the sprocket. Should the sprocket come to rest when the pawl 33 is opposite a tooth 31, the window will drop a trifle and thus rotate the sprocket and pawl until the pawl reaches the next notch 32.

The parts of the clutch and movable locking device are securely held in place on the spindle 26 between a shoulder 49 formed thereon and a nut 50 applied to the end of the spindle.

Figure 17:
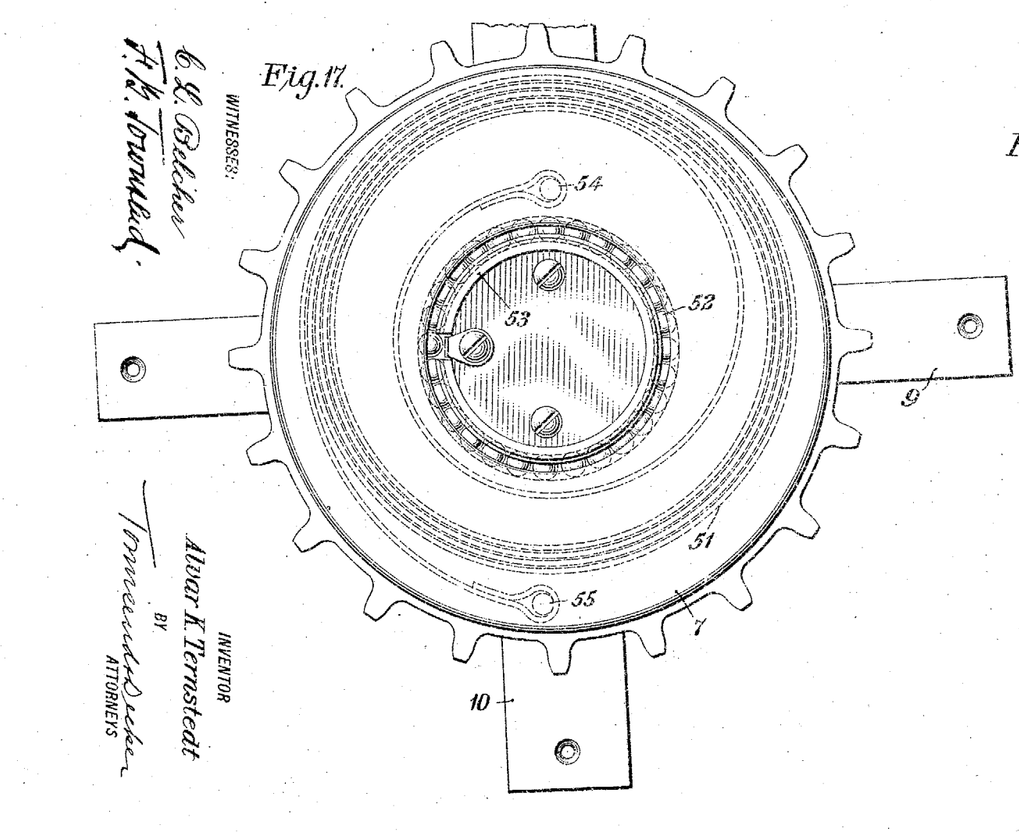
Fig. 17 is an enlarged front elevation of one of the chain sprockets and shows in dotted lines the spring which counteracts the weight of the window and assists in raising the same.
Figure 18:
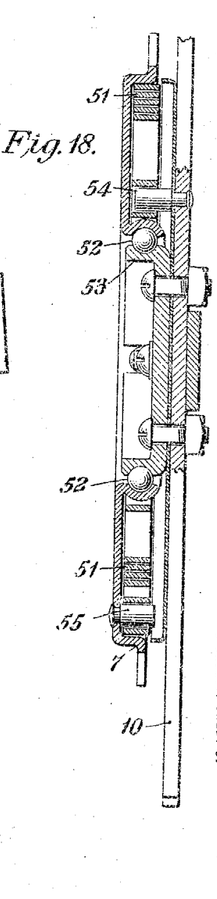
Fig. 18 is a central transverse section through the sprocket shown in Fig. 17.

To counteract the weight of the window and to assist in raising it so that excessive power will not need to be applied to the handle 27 to effect the raising a coil spring 51, located in the sprocket wheel 7, is provided. The sprocket 7 is mounted to rotate freely on a ball-race 52 interposed between it and the sprocket hub 53 mounted on the arm or plate 10. The inner end 54 of the spring 51 is fixed to the stationary plate or arm 10 while the outer end 55 is fixed to the sprocket wheel. When the window is lowered, the sprocket wheel 7 is rotated and energy is stored in the spring 51. When the window is raised the sprocket 7 is rotated in the reverse direction and the spring 51 unwinding assists in the raising of the window. The tension of the spring 51 is not sufficient to raise the window by itself but is merely used to assist in the operation by balancing the weight.

The operation of the device is as follows, assuming the window to be closed over the weather rail and the cam follower in the position shown in Fig. 7, the clutch and locking pawl being in the positions shown in Fig. 5: The handle 27 is turned in a clock-wise direction, the first act resulting therefrom being to withdraw the pawl 33 from the notch 32 of the fixed lock-plate 30 in which it is located in a manner as previously described. By this same action the clutch members 41 and 34 are coupled together and the sprocket 6 is free to be rotated direct from the handle 27. On continuing the rotation of the handle 27 the first action which then takes place is the cam follower rises out of the depression 15 at the end of the slot 14 which raises the cam-plate and carries the window above the weather rail. Further rotation of the sprocket 6 carries the cam follower up on the face cam 13 and draws the window transversely over the weather rail and directly in line with the space in the lower part of the door. Continued rotation of the sprocket causes the cam follower to travel downward with the chain 5 and lowers the window due to pulling the cam-plate down. Should it be desired to but partly lower the window, the handle 27 is released when the window has been dropped the desired amount and the pawl 33 immediately springs into a notch 32 of the stationary lock-plate 30 and any further movement is prevented. If it is desired to lower the window still farther the handle is merely turned clock-wise and the same action of automatically unlocking and establishing the driving couple is repeated.

When it is desired to raise the window any amount or to close it entirely the handle 27 is rotated counter clock-wise and the same actions are repeated. When the window reaches its uppermost position further rotation of the handle causes the cam follower to ride down on the cam 13 which action forces the window over the weather rail, the last action due to the final rotation being that the cam follower drops down in the depression 15 in the slot 14 and the window sash is pressed forcibly down on top of the window sill outside of the weather rail. By providing the drop 15 in the slot 14 a great advantage is gained in that the window sash can be forcibly pressed down onto the sill and a tight closure made. Also the tension in the spring 51 serves to press the window down onto the sill.

If desired the window may merely be pressed against the weather rail by moving it transversely to its plane and not forced entirely over the rail.

It will be understood that the invention is not limited to the details of construction shown and described, such being for the purposes of illustration only, but various modifications and equivalents may be employed without departing from the spirit of the invention as set forth in the appended claims.

It will be understood that wherein the term "chain drive" is used, it is intended to cover a chain or any equivalent form of drive.

What I claim as my invention is:

1. In a window operating device, the combination of a cam mechanism for moving the window in both directions transverse to its plane, said mechanism comprising two cam surfaces and means including a pin adapted to engage both said surfaces when moving the window in either direction.

2. In a window operating device, the combination of a cam mechanism for moving the window both back and forth across the weather rail, said mechanism comprising opposed cam surfaces and an actuating pin provided with means engaging both said opposed surfaces during movement of the window in either direction.

3. In a window operating device, the combination of raising and lowering means and cam mechanism adapted to positively move the window in both directions transverse to its plane and actuated by said means, said mechanism comprising a cam surface for forcing the window in one direction transverse to its plane and a second cam surface for forcing the window in the opposite direction, and means including a pin adapted to engage both said surfaces during the movement of the window in both directions.

4. In a window operating device, the combination of cam mechanism for moving the window positively in both directions transverse to its plane and comprising a plate depending from the window and an actuating pin having means positively engaging opposite surfaces of said plate when moving the window in either direction.

5. In a window operating device, the combination of raising and lowering means and cam mechanism for moving the window positively in both directions across the weather rail, said mechanism comprising a plate depending from the window, a pin having means positively engaging opposite surfaces of said plate when moving the window in either direction and cam surfaces brought into operation by said means and adapted to positively force the window in both said directions.

6. In a window operating mechanism, the combination with the weather rail, of a chain drive, a cam-plate secured to the window, a cam follower carried by the chain drive and adapted to coöperate with said cam-plate to raise and lower the window and force it over the weather rail and a spring for maintaining the relation between the cam-plate and cam follower.

7. In a window operating device, the combination of a chain drive, a cam-plate secured to the window, a cam follower forming a link of said drive and having a head engaging a surface of said plate, a collar loose on said follower and adapted to engage the opposite surface of said plate and means adapted to keep said collar against said plate.

8. A window operating device comprising a cam-plate adapted by the conformation of its surfaces to force the window both over the weather rail and back, said cam-plate being also provided with a downwardly disposed slot to press the window onto the sill.

9. In a window operating device, the combination of a chain drive, a plate secured to the window, a pin secured to the chain and a spring connected at each end to a link of the chain to automatically take up the slack in said drive.

10. In a window operating apparatus, the combination of a chain drive, a sprocket, a clutch member having a driving connection with said sprocket, a spindle, a pawl for locking said sprocket and means operated by said spindle for moving said pawl radially to unlock said sprocket and adapted on continued rotation of said spindle to drive said sprocket.

11. In a window operating apparatus, the combination of a chain drive, a sprocket therefor, a spindle for rotating said sprocket, a clutch member having a permanent driving connection with said sprocket, a locking pawl carried by said clutch member, a fixed locking plate for said pawl, a second clutch member having a fixed connection with said spindle and means adapted to withdraw said pawl radially into unlocked position and then establish a driving couple between said spindle and said sprocket.

12. In a window operating device, the combination of a chain drive, a sprocket, a spindle, a clutch member loose on said spindle and having a permanent driving connection with said sprocket, a locking pawl carried by said clutch member, a fixed locking plate for said pawl, a clutch member fixed on said spindle and means adapted to withdraw said pawl radially into unlocked position and then establish a driving couple between said spindle and said sprocket.

13. In a window operating apparatus, the combination of a chain drive, a sprocket, a spindle, a clutch member loose on said spindle and having a driving connection with said sprocket, a rotary pawl for locking said spindle, means operated by said spindle for moving said pawl radially to unlock said sprocket, said means being adapted on continued rotation of said spindle to drive said sprocket.

14. In a window operating apparatus, the combination of a chain drive, a sprocket, a spindle, a clutch member loose on said spindle, a pin and slot connection between said member and said sprocket, coupling pins secured to said member, a locking pawl radially movable into inoperative position, a clutch member fixed to said spindle and cams carried by said fixed clutch member and adapted to engage said coupling pins and to first render said locking pawl inoperative and then establish a driving connection between said spindle and said sprocket.

15. In a window operating device, the combination of a chain drive, a sprocket, a spindle, an operating handle for said spindle, a clutch member loose on said spindle and having a driving connection with said sprocket, clutch pins secured to said member, a stationary annular plate having a plurality of teeth, a locking pawl carried by said member and adapted to engage said teeth to lock said sprocket, a fixed clutch member on said spindle provided with cams for engaging said clutch pins and actuating the sprocket, means whereby said cams will first radially withdraw said pawl from said teeth to unlock said sprocket and then establish a driving connection between said handle and said sprocket and means for automatically resetting said pawl radially into locking position after said handle has been released.

Signed at New York, in the county of New York and State of New York, this 14th day of December, A. D. 1911.

ALVAR K. TERNSTEDT.

Witnesses:
F. B. TOWNSEND,
M. A. PORTER.